United States Patent Office 3,810,960
Patented May 14, 1974

3,810,960
PHOSPHORUS-CONTAINING MONOESTERS OF UNSATURATED DICARBOXYLIC ACIDS
William T. Gormley and Muchere C. Russ, Pittsburgh, Pa., assignors to Koppers Company, Inc.
No Drawing. Filed Nov. 9, 1972, Ser. No. 305,189
Int. Cl. C07f 9/40
U.S. Cl. 260—952    7 Claims

ABSTRACT OF THE DISCLOSURE

Benzenephosphonic acid monoesters of glycol monoesters of ethylenically unsaturated dicarboxylic acids have been prepared by esterifying benzenephosphonic acid with the alcohol portion of an alkyleneglycol monoester with an unsaturated dicarboxylic acid. The novel esters are useful as flame retardant additives for thermoplastic and thermosetting resins.

BACKGROUND

Phosphorus compounds are known to be useful as additives for various thermoplastic and thermoset materials. The presence of the phosphorus in the compounds is credited with furnishing various effects, such as flame retardancy, plasticization and surfactant effects.

Many additives, with or without phosphorus, suffer from the defect that the additives migrate to the surface of the polymeric materials in which they are used, thus causing the desired effects to be lessened with time as the additives evaporate or are rubbed off the surface.

One way to eliminate the problem of migration and loss of additive is to polymerize the additive into the polymer and thus obtain internal activity, such as internal plasticization, etc.

The novel phosphorus compounds of the present invention are especially useful as such internal additives. They are especially useful because the unsaturation allows them to be copolymerized with various thermoplastic monomers such as styrene as well as with various thermosetting compositions such as unsaturated polyester resins and the like.

In addition the novel compounds of the invention are useful as surfactants because of the free phosphonic acid groups and the free carboxylic groups in their molecules.

SUMMARY OF THE INVENTION

Several novel phosphorus compounds have been prepared having free phosphonic acid groups, internal carbon to carbon unsaturation, and free carboxyl groups. The compounds are prepared by reacting a mixture of benzenephosphonic acid and a glycol monoester of an ethylenically unsaturated dicarboxylic acid in a solvent suitable for the removal of the water of reaction by azeotropic distillation.

DETAILED DESCRIPTION

The novel compounds of the invention are benzenephosphonic acid monoeters of glycol monoesters of ethylenically unsaturated dicarboxylic acids, said phosphonic acid monoesters having the general formula:

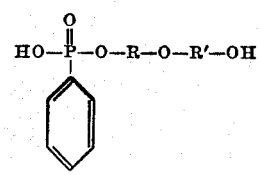

where R is selected from the group consisting of alkylene having 2 to 8 carbon atoms, and alkyleneoxy having the formula

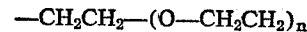

where $n$ is 1 to 2; and R' is selected from the group consisting of maleoyl, fumaroyl, mesaconoyl, citraconoyl, itaconoyl, and mixtures thereof.

The benzenephosphonic acid monoesters are prepared, generally, by heating a mixture of benzenephosphonic acid and a glycol monoester of an ethylenically unsaturated dicarboxylic acid in a solvent suitable for the removal of the water of reaction by azeotropic distillation.

The solvent may be any of aromatic hydrocarbons known to form azeotropic compositions with water, such as benzene, xylene, ethylbenzene, diethylbenzene, and the like. For the lower molecular weight esters, the lower boiling solvents such as xylene are preferred. For the higher molecular weight esters, a higher boiling solvent such as diethylbenzene is preferred.

In order to minimize the amount of solvent necessary to remove the water of reaction, the heating is preferably carried out under reflux conditions using a Dean-Stark trap between the flask and the reflux condenser to remove the water as it azeotropes from the reaction mixture with the solvent.

The intermediate glycol monoesters are prepared by the general procedure of heating a stirred mixture of an acid anhydride with an equivalent molar quantity of a glycol for about two hours at 60-80° C. The structures of the intermediates were confirmed by spectrometric analysis.

The glycols usable in the preparation of the novel intermediates are the alkylene glycols, such as ethylene glycol, propylene glycol, 1,3-propanediol, 1,4-butanediol, 1,6-hexanediol, 1,4-cyclohexanedimethanol, and the alkyleneoxy glycols, such as diethyleneglycol, triethyleneglycol, and the like.

The acid portion of the intermediate monoesters may be any of the ethylenically unsaturated dicarboxylic acids, such as maleic acid, fumaric acid, citraconic acid, mesaconic acid, itaconic acid, and the like. The preferred acid is maleic acid because of the ready availablity and low cost of maleic anhydride. Partial isomerization of the maleic acid entity during esterification has been found to lead to the mixed maleate-fumarate esters having a ratio of maleate to fumarate between 85 to 15 and 15 to 85. The exact ratio obtained varies with the particular glycol acid used.

EXAMPLE I

To a 500 ml. 3-necked round bottom flask equipped with a stirrer and a reflux condenser, was added 0.30 mole of maleic anhydride and 0.30 mole of pure trans-1,4-cyclohexanedimethanol. The mixture was heated at 75–90° C. for 1.25 hours with stirring to give an essentially quantitative yield of a white, waxy-solid shown by infrared spectroscopy to be the desired mono(trans-1,4-cyclohexanedimethano)maleate.

After inserting a Dean-Stark trap between the flask and the reflux condenser, there was added to the unisolated monoester 0.30 mole of benzenephosphonic acid and 200 ml. of diethylbenzene (B.P. 183° C.). The mixture was heated at reflux temperature with stirring for 1.75 hours. The water of reaction was removed as it azeotroped off with the diethylbenzene into the Dean-Stark trap. When 0.30 mole of water had been removed, the reaction was cooled to room temperature, the excess diethylbenzene decanted off, and the product dried in a vuccum oven overnight. There was obtained an 86% yield of crude waxy solid product which was shown by spectrometric examination to be the desired benzene phosphonic ester contaminated with about 20% of diethylbenzene. The carboxylic acid portion of the final ester product was found to consist of 26% by weight of the fumarate and 74% by weight of the maleate.

EXAMPLE II

The procedure of Example I was repeated using a commercial grade of 1,4-cyclohexanedimethanol consisting of a mixture of cis- and trans-isomers in the proportion 30% cis- and 70% trans.

The mono - (1,4 - cyclohexanedimethanol) maleate formed was a mixture of the cis- and trans-isomers present in the same proportions as the starting diol.

Reaction of this mixed isomers mono-ester of maleic acid with equimolar amounts of benzenephosphonic acid in refluxing diethylbenzene gave a 91% yield of a tan viscous liquid which was dried under vacuum. This crude product was shown by spectrometirc analysis to be the desired benzenephosphonic ester contaminated with about 20% diethylbenzene. The maleate to fumarate ratio of the carboxylic acid portion of the ester was found to be 60 maleate to 40 fumarate.

EXAMPLE III

Monoethyleneglycol maleate was prepared by heating a stirred equimolar mixture of ethylene glycol and maleic anhydride for about 2 hours at 60–80° C. A stirred mixture of 0.10 mole benzenephosphonic acid and 0.10 mole monoethyleneglycol maleate was heated for 4 hours in 240 ml. refluxing xylene while removing the water of reaction in a Dean-Stark trap. The xylene was decanted at 25° C. and the viscous, amber residue was washed by decantation with n-hexane to give a 93.3% yield of semisolid product. The product was shown to be benzenephosphonic ester of monoethyleneglycol maleate by infrared analysis. Nuclear magnetic resonance studies showed the product to contain 82% of the fumarate ester and 18% of the maleate ester.

The benzenephosphonic ester of monopropyleneglycol maleate prepared by the same process was found to contain 70% of the fumarate and 30% of the maleate ester.

Similarly, the benzenephosphonic ester of monotriethylene-glycol maleate was found to contain 15% of the fumarate and 85% of the maleate ester.

EXAMPLE IV

To illustrate the utility of the phosphonic compounds as flame-retardant additives, 40 g. of the phenylphosphonic ester of monopropyleneglycol maleate was added to a mixture of 114 g. of styrene in 266 g. of an unsaturated polyester resin made from ethylene glycol, maleic anhydride, and tetrachlorophthalic anhydride. To this mixture was added 4 g. of benzoyl peroxide and the mixture cast between two glass plates for 6–8 hours at 70° C. A control sample of the same resin without the phosphonic ester was made under identical conditions. The castings were tested by a limiting oxygen index (LOI) test developed at General Electric Company. The LOI is a measure of the lowest percentage of oxygen in a nitrogen-oxygen atmosphere which will allow the sample to burn. The more oxygen required, the more self-extinguishing the sample tested is considered. The control sample in this example had an LOI of 29% oxygen compared to 34% oxygen for the sample containing 40 g. phosphonic ester per 420 parts of resin. This shows the fire retardancy of the phosphonic ester additive.

What is claimed is:

1. Benzenephosphonic acid monoesters of glycol monoesters of ethylenically unsaturated dicarboxylic acids, said phosphonic acid monoesters having the general formula:

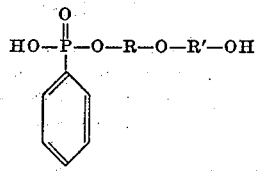

where R is selected from the group consisting of alkylene having 2 to 8 carbon atoms, 1,4-cyclohexanedimethylene, and alkyleneoxy having the formula

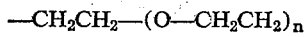

where $n$ is 1 to 2; and R' is selected from the group consisting of maleoyl, fumaroyl, mesaconoyl, citraconoyl, and itaconoyl.

2. The ester of claim 1 wherein said ester is benzenephosphonic acid ester of monoethyleneglycol maleate.

3. The ester of claim 1 wherein said ester is benzenephosphonic acid ester of monopropyleneglycol maleate.

4. The ester of claim 1 wherein said ester is benzenephosphonic acid ester of monodiethyleneglycol maleate.

5. The ester of claim 1 wherein said ester is benzenephosphonic acid ester of monotriethyleneglycol maleate.

6. The ester of claim 1 wherein said ester is benzenephosphonic acid ester of mono(1,4-cyclohexanedimethanol) maleate.

7. A mixture of esters consisting of from 85 to 15 weight percent of an ester of claim 1 wherein R' is maleoyl and correspondingly 15 to 85 weight percent of an ester of claim 1 wherein R' is fumaroyl.

References Cited

UNITED STATES PATENTS 3,158,641  11/1964  Reed et al. _____ 260—952
3,419,642  12/1968  McGary et al. _____ 260—952

LORRAINE A. WEINBERGER, Primary Examiner
R. L. RAYMOND, Assistant Examiner

U.S. Cl. X.R.
260—45.85